(No Model.)
N. J. JOHNSON.
DRILL ATTACHMENT FOR BROADCAST SEEDERS.
No. 421,501. Patented Feb. 18, 1890.
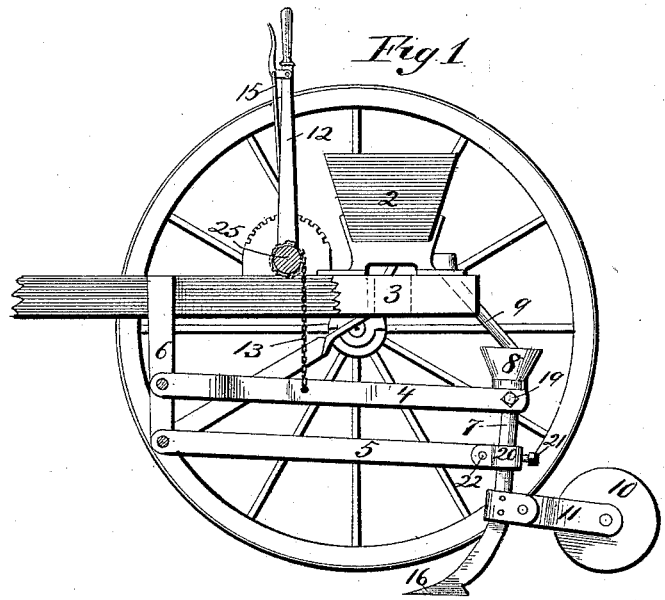
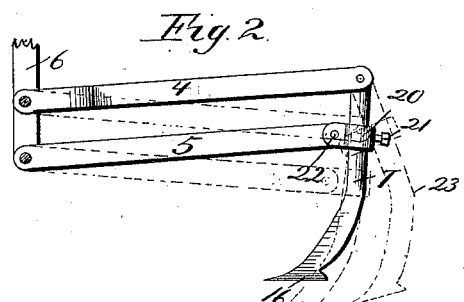
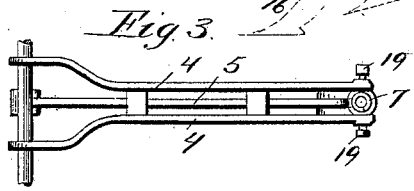
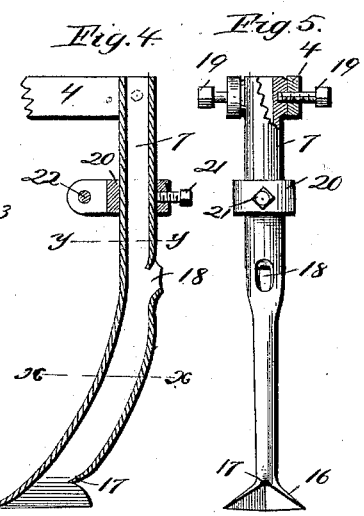
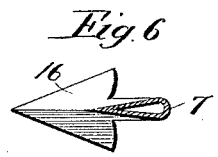
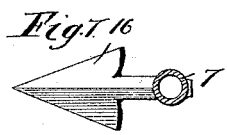
Witnesses.
J. Jensen.
Roy S. Gaskill.
Inventor.
Nels J. Johnson.
By Paul A. Merwin Attys.

UNITED STATES PATENT OFFICE.

NELS J. JOHNSON, OF GRAFTON, (DAKOTA TERRITORY,) NORTH DAKOTA.

DRILL ATTACHMENT FOR BROADCAST-SEEDERS.

SPECIFICATION forming part of Letters Patent No. 421,501, dated February 18, 1890.

Application filed August 5, 1889. Serial No. 319,797. (No model.)

*To all whom it may concern:*

Be it known that I, NELS J. JOHNSON, of Grafton, in the county of Walsh and Territory of Dakota, have invented certain new and useful Improvements in Drill Attachments to Seeders, of which the following is a specification.

My invention relates to improvements designed to be attached to broadcast grain-seeders, by means of which they are transformed to grain-drills at a small additional expense; and it consists in removably attaching a series of pipe-drills of improved construction having suitable attachments by means of which the grain is conveyed into the soil instead of being sown broadcast, and further consists in the construction and combination hereinafter described, and particularly pointed out in the claims.

My improved drills are very cheaply constructed, each being made from a single piece of iron or steel pipe, one end of which is split and partially flattened out and pointed to form the hoe end of the drill.

In the accompanying drawings, forming a part of this specification, Figure 1 is a side elevation of a seeder fitted with my drill attachments, one of the wheels being removed. Fig. 2 is a detail of the drill, showing its attachment to the drag-bar. Fig. 3 is a plan view of the same. Fig. 4 is a vertical longitudinal section of one of the drill-tubes. Fig. 5 is a rear elevation of the same. Figs. 6 and 7 are horizontal cross-sections of the same on the lines $x\,x$ and $y\,y$, respectively, of Fig. 4.

In the drawings, 2 represents the grain-box of the seeder; 3, the main supporting-frame of the seeder; 4 4, the main drag-bars; 5 5, the lower secondary drag-bars; 6 6, depending arms or standards rigidly secured to the frame of the seeder, to which are pivotally secured the drag-bars 4 and 5; 7, the drill-tube; 8, the hopper or funnel, into which the grain runs from the cups of the grain-box 2 by means of the conducting-pipes 9, and from which the grain descends through the drill-tube.

10 is a follower or presser-roll, attached by means of the arm 11 to the drill-tube, and serves to press the soil firmly down upon the seed deposited therein by the drill. A suitable lever 12, secured to the roll 25, mounted transversely upon the frame of the drill, upon which the lifting-chains 13, attached to the drag-bars 4, are wound, serves to raise and lower the drag-bars and the drills thereto attached and determine the depth at which the hoes shall penetrate the soil. A quadrant upon the frame of the seeder and adapted to be engaged by a spring-catch 15, secured to the lever, serves to hold the lever in any desired position and support the drills at any desired elevation or to lower them to any required depth.

I prefer to construct the drill-tube from a single piece of iron or steel tubing, the upper portion being left cylindrical or elliptical in cross-section and straight, the lower portion being bent forward, as shown in the drawings, and brought in front, preferably, to a sharp angle or cutting-edge, as shown in detail, Fig. 6. The lower end of the tube is split open a short distance on the rear side and the edges cut transversely a short distance at the end of the slit, the two portions then being turned outward and flattened and trimmed to a point to form the wings or shares of the hoe 16. The edges of the hoe are preferably flattened or sharpened, so as to readily cut through the soil. The lower end 17 of the rear wall of the tube is preferably dented or bent inward, as shown in Fig. 4, so as to throw the descending grain forward and spread it right and left under the arch of the hoe. A peep-hole 18 is arranged in the rear wall of the drill at such a height and angle as to render it convenient for one walking behind the machine to see at a glance whether the drills have become clogged in any way.

I prefer to secure the drill in the drag-bar 4 by means of the set-screws 19, arranged in the two members of the drag-bar and screwed into the opposite sides of the drill-tube. The tube is also secured to the secondary or lower drag-bars 5 5, preferably by means of the collar or sleeve 20, secured firmly to the tube by means of the set-screw 21, its two ends embracing the end of the bar 5 and being secured thereto by means, preferably, of a wooden pin 22, which will break if the drill strikes an obstacle or meets with any severe strain, thus preventing breakage of any of the parts or attachments, the drill being turned backward, as shown by the dotted lines 23 in Fig. 2.

The advantage of this construction of the drill-hoe is that it will penetrate and cut through the soil without disturbing it unnecessarily, as is the case with hoes of other construction, which is an important feature from the fact that it is essential in seeding small grains in comparatively dry or windy sections that the surface soil should be as firm and compact as possible, the grain being deposited in the soil with the covering over it nearly as firmly as before the drill passed through it. Besides, the drill being made of a solid piece of tubing, there are no rivets or bolts to catch the soil and obstruct passage through it, and the tool can be made at a comparatively much less expense than that of the ordinary construction, and my improvement can be attached to any ordinary seeder, so that with a trifling additional outlay a combined broadcast seeder and grain-drill is secured.

The advantage of the secondary bar 5 is that as the drag-bar and its drill are raised or lowered the drill is held in substantially the same position, with the under side of the hoe horizontal, so that equally effective and smooth work is done at any depth, whereas in the ordinary manner of constructing the drill the angle of the hoe is changed with the difference in depth.

The conducting-pipes 9 may, if necessary, be made flexible or with telescopic joints to take up the vertical motion of the hoppers as the drills are raised and lowered.

I claim—

1. A grain-drill tube formed from a single piece of metal tubing, having the peep-hole 18 in its rear wall, with its upper portion straight and cylindrical and its lower portion curved and formed to an acute angle in front, and having its end split, with the slitted edges turned outward and pointed to form the shares, substantially as and for the purposes set forth.

2. In a grain-drill, the combination, with the seed-box and supporting-frame for the tubes, of a series of drill-tubes, each formed of a single piece of tubing having its lower portion curved and formed to an acute angle in front, with the end slitted vertically and cut transversely at the end of the slit, and the side portions turned outwardly to form shares, and the rear wall bent inwardly to form a spreader for the seed, substantially as and for the purposes set forth.

3. The combination, with a grain-seeder having the grain-box 2, conducting-pipes 9, and the drag-bars 4, parallel with each other, and the secondary bars 5, located below and in a line between said bars 4, of the drill-hoe 7, having its upper portion extended between the bars 4 and pivotally secured to them, and at a lower point pivotally connected with the central secondary bar, substantially as and for the purposes set forth.

4. In a grain-drill, the combination, with a seed-box, of a series of drag-bars, each composed of two parallel bars 4, a series of drills, one of each passing between the parallel bars 4 and pivoted at their upper ends thereto, secondary bars 5, each pair of parallel bars 4 having one of said bars 5 located beneath and in a line between them, and pivotally connected by a breakable pin with the drill-tube, substantially as and for the purpose set forth.

In testimony whereof I have hereunto set my hand this 25th day of July, 1889.

NELS J. JOHNSON.

In presence of—
T. D. MERWIN,
A. C. PAUL.